US006823655B2

(12) United States Patent
Underhill et al.

(10) Patent No.: US 6,823,655 B2
(45) Date of Patent: Nov. 30, 2004

(54) VERTICALLY PIVOTING PLASTIC HEADER SIDE SHIELD

(75) Inventors: Kenneth R. Underhill, Strasburg, PA (US); Keith J. Comer, State College, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/349,442

(22) Filed: Jan. 22, 2003

(65) Prior Publication Data

US 2004/0139718 A1 Jul. 22, 2004

(51) Int. Cl.$^7$ .............................................. A01D 65/00
(52) U.S. Cl. ...................... 56/314; 56/119; 56/DIG. 24
(58) Field of Search ........................... 56/119, 314, 318, 56/319, 320, 51, DIG. 20, DIG. 24

(56) References Cited

U.S. PATENT DOCUMENTS

| | | | | |
|---|---|---|---|---|
| 3,241,301 A | * | 3/1966 | Dyrdahl .................... | 56/16.4 R |
| 3,722,194 A | * | 3/1973 | Halls ........................... | 56/226 |
| 3,780,505 A | * | 12/1973 | Pettengill et al. ........... | 56/14.4 |
| 3,808,783 A | * | 5/1974 | Sutherland et al. ........... | 56/106 |
| 3,881,305 A | * | 5/1975 | Burrough ..................... | 56/257 |
| 3,967,439 A | * | 7/1976 | Mott ............................ | 56/314 |
| 4,206,583 A | * | 6/1980 | Week et al. ................. | 56/15.8 |
| 4,299,080 A | * | 11/1981 | Kelly .......................... | 56/314 |
| 4,630,431 A | * | 12/1986 | Schlueter et al. .............. | 56/28 |
| 5,195,309 A | * | 3/1993 | Mossman .................... | 56/119 |
| 5,564,749 A | | 10/1996 | Branham .................... | 280/830 |
| 5,865,019 A | | 2/1999 | Hurlburt et al. .............. | 56/119 |
| 5,960,618 A | * | 10/1999 | Kerber ........................ | 56/119 |
| 6,058,688 A | * | 5/2000 | Krambeck et al. ........... | 56/14.5 |
| 6,341,481 B1 | * | 1/2002 | van der Merwe ............. | 56/95 |

\* cited by examiner

*Primary Examiner*—Thomas B. Will
*Assistant Examiner*—Alicia Torres
(74) *Attorney, Agent, or Firm*—John William Stader; Collin A. Webb (57) ABSTRACT

An improved rotomolded plastic harvester header side shield is disclosed. The shield is pivotable to an open position upwardly and rearwardly about a horizontal hinge located on the upper rear portion of the header. The shield is generally molded on the inside to the operational components of the header to minimize the thickness and weight of the shield and double-walled, with a totally enclosed wall cavity, to maximize its strength and durability. The shield is also open at the bottom to permit any cut crop material and chaff that may enter the shielded area to continually fall through to the ground.

14 Claims, 6 Drawing Sheets

VERTICALLY PIVOTING PLASTIC HEADER SIDE SHIELD

CROSS-REFERENCE TO RELATED APPLICATIONS

The invention in this application is related to that disclosed and claimed in U.S. application Ser. No. 10/348,738, entitled "Vertically Pivoting Header Side Shield and Latch Mechanism". The referenced application was filed on the same date as the instant application and in the name of the Kenneth R. Underhill.

BACKGROUND OF THE INVENTION

The present invention relates generally to an agricultural crop harvester header, and more particularly to a unique side shield and latch mechanism for the outside ends of such headers.

In modern agriculture, especially in regard to harvesting forage crops, it is the current practice to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations, such as baling.

The most recent designs of windrower headers employ a consolidating auger operationally behind a cutterhead and rotating reel to receive the cut crop material and convey it centrally of the header from either lateral end portion thereof for feeding into a crop-conditioning mechanism, conditioning rolls, for instance. A header of this general type is shown and described in U.S. Pat. No. 3,324,639 issued to L. M. Halls et al. on Jun. 13, 1967 and U.S. Pat. No. 4,296,592 issued to Irwin D. McIlwain on Oct. 27, 1981.

Typically, the major components of all harvester crop headers, including side shields, have been formed from sheet metal. One aspect of the instant invention is that the shield be formed by a rotational molding process.

Rotational molding is a known process used for manufacturing plastic components by first creating a mold formed in the shape of the component to be formed, and then pouring a suitable quantity of powdered polyethylene resin into the mold, after which the mold is closed, heated to about 600° F. and slowly rotated for approximately ten minutes to evenly distribute the resin to the periphery of the mold. The heating process converts the powdered resin into an integral plastic sheeting having a generally uniform thickness conforming to the shape of the mold. The material thickness of the component part being formed is dependent on the amount of resin material first poured into the mold. By precise formation of the mold and careful calculation of the amount of resin to be applied, a generally hollow polymer component can be formed from this process.

The rotational molding process has not been traditionally used in constructing parts for agricultural equipment. Such component parts have typically been cast of metal or formed from sheet metal to provide the desired durability and function. Nevertheless, rotationally molded components are manufactured with significantly less cost than corresponding metallic parts and contain significantly less weight. Furthermore, the function of metallic components have heretofore not been duplicated, such as providing hinged closures and liquid-tight connections.

Traditional header side shields of the type under consideration herein are attached to the header or side sheet by generally vertical hinges. To open the shield for access to the shielded components, the shield is pivoted outwardly and rearwardly from the front.

Additionally, headers of this type are subject to considerable physical abuse. Not infrequently, the ends of the headers strike fence and gateposts, rocks, tree stumps, bales of hay, and the like. Often, encounters of this kind result in dents and breakage of the shield.

Plastics have been found to present particular problems in agricultural applications that relates to high ambient temperatures. One of the biggest single markets for windrower headers is in the Imperial Valley where ambient temperatures are known to rise as high as 160° F. Plastics, particularly large pieces of plastic tend to expand more than other materials, such as steel, raising fit and alignment problems.

Accordingly, it would be highly desirable to provide a unique structure for a rotationally molded side shield and latch mechanism for a harvester header side shield that overcome the above-identified problems.

SUMMARY OF THE INVENTION

Accordingly, it is an object of the present invention to provide a header side shield that is stable, convenient and safe to operate.

It is a further object of the present invention to provide a header side shield that pivots upwardly and rearwardly to provide complete access to the operational components of the header for lubrication, inspection, adjustment, and repair.

It is a still further objected of the present invention to provide a header side shield that pivots upwardly and rearwardly about a horizontal hinge located away from most damaging obstacles and allows for access in tight quarters, such as a narrow shed or service bay, where a side opening shield could not be fully opened.

Another object of the present invention is to provide a header side shield that minimizes the interference to the flow of uncut crop material rearwardly along the side of the header.

Another object of the present invention is to provide a header styled, streamlined and modern looking in appearance that is crop-friendly to minimize crop knock down and has no sharp edges or protrusions to run down or hairpin crop materials.

It is another object of the instant invention to provide a header side shield that reduces the build-up of cut crop material and chaff between the shield and the component supporting structure (side sheet) of the header.

It is yet another object of this invention to provide an improved header side shield that is durable in construction, inexpensive of manufacture, carefree of maintenance, facile in assemblage, and simple and effective to set up, adjust and use.

It is yet another object of the present invention to provide an improved side shield that maximizes operator's sight line, provides no sharp edges or protrusions to run down or hairpin crop materials, and uses molded-in inserts to attach latches, light brackets and hinges.

It is a still further object of the present invention to provide a side shield for a harvester header that is formed from a rotational molding process.

It is a still further object of the present invention to provide a double-walled dent-resistant side shield for a harvester header that is rotomolded of UV stabilized polyethylene material.

These and other objects are attained by providing an improved rotomolded plastic harvester header side shield.

The shield is pivotable to an open position upwardly and rearwardly about a horizontal hinge located on the upper rear portion of the header. The shield is generally molded on the inside to the operational components of the header to minimize the thickness and weight of the shield and double-walled, with a totally enclosed wall cavity, to maximize its strength and durability. The shield is also open at the bottom to permit any cut crop material and chaff that may enter the shielded area to continually fall through to the ground.

DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT

In the following description, right hand and left hand references are determined by standing at the rear of the machine and facing in the direction of forward travel. Also, in the following description, it is to be understood that such terms as "forward," "left," "upwardly," etc., are words of convenience and are not to be construed as limiting terms.

Figure 1:
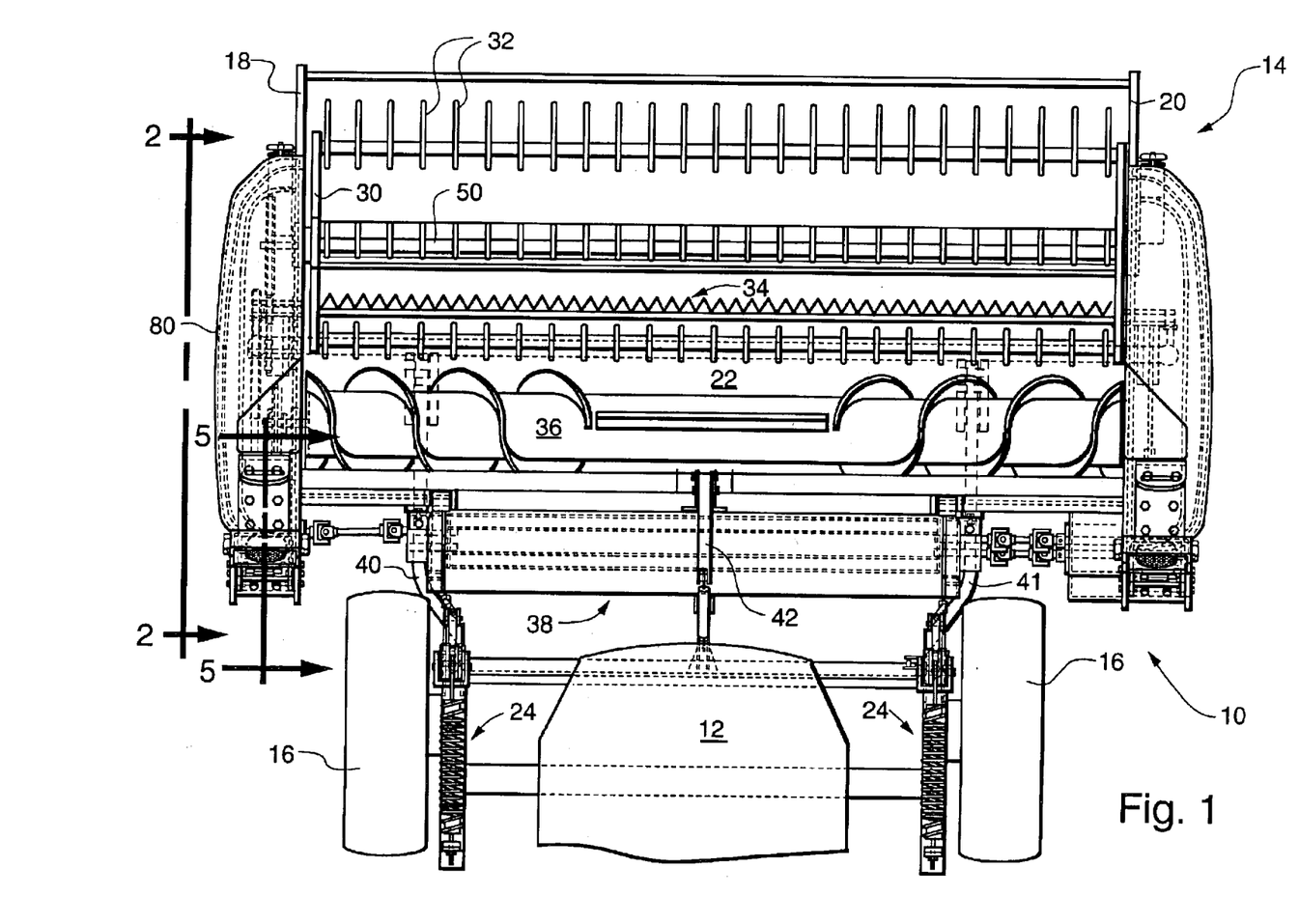
FIG. 1 is a partial top plan view of an agricultural header including the shield and latch mechanism of the instant invention.

Referring now to the drawings, and particularly to FIG. 1, there is partially shown a crop-harvesting machine, such as a self-propelled windrower, generally indicated by numeral 10, incorporating the principles of the present invention. While the machine 10 is of the self-propelled type, the improved structure incorporated therein may readily be incorporated into a pull-type machine, or a header attached to a traditional tractor.

The machine 10 is provided with a mobile frame, generally designated 12, which is commonly referred to as a power unit or tractor and adapted to move forwardly across a field. An elongated header 14 is disposed forwardly of the tractor 12 and extends transversely to the forward direction for harvesting crop material from the field as the tractor 12 advances forwardly.

The tractor 12 includes a main frame with a pair of laterally spaced rear castor-type wheels (not shown) depending from the rear end thereof (not shown). Depending from the front end of the main frame is a pair of laterally spaced front wheels 16. The tractor 12 further includes a power source (not shown) mounted adjacent the rear end thereof and suitable known drive components (not shown) for transmitting power to the front wheels 16 and the header 14. For a more complete understanding of an exemplary arrangement of the power source and drive components, attention is directed to U.S. Pat. Nos. 3,699,754 and 3,777,833. A more detailed description of such features need not be presented herein for a complete understanding of the present invention.

The header 14 includes a pair of vertical side sheets 18, 20 and a curved floor 22 extending laterally therebetween. Centrally defined in a rear vertical portion of the floor 22 is a generally rectangular discharge opening (not shown). As will be subsequently described in greater detail, the header 14 is adapted for flotation on the field by a suspension system, generally designated by numeral 24, which supports most of the weight of the header 14. The remaining weight of the header 14 is supported on the field by a pair of ground engaging skid shoes 2 (not shown) fixed to the lower outside portions of the header 14.

Further, the header 14 includes a transversely extending reel 30 being rotatably mounted at its opposite ends forwardly between the header side sheets 18, 20. The reel 30 is provided with a series of tines 32 laterally spaced about the periphery thereof and, as the reel 30 is rotated in counter-clockwise fashion, adapted to engage the oncoming standing crop and sweep it rearwardly over a cutterbar assembly 34 mounted at its opposite ends forwardly between the header side sheets 18, 20 and along the forward edge of the header floor 22 at a transversely-extending position spaced below the reel 30 and just above the ground. Disposed behind the reel 30 is a transversely-extending auger 36 also being mounted at its opposite ends to the header side sheets 18, 20 and adapted to receive the cut crop moved rearwardly up the floor 22 by the reel 30, consolidate it and discharge it into the discharge opening defined in the rear vertical portion of the floor 22. A well-known conditioning unit 38 is mounted beneath the forward end of the main frame and between the front wheels 16 will receive the crop material moved rearwardly through the header discharge opening, condition it and deposit it in a windrow back on the field. Such arrangement of the conditioning unit is disclosed in greater detail in U.S. Pat. No. 3,699,754. A more detailed description of such arrangement need not be presented herein for a complete understanding of the present invention.

As briefly mentioned hereinabove, the header 14 is adapted for flotation on the field by an exemplary suspension system 24 that pivotally mounts the header 14 from the tractor 12. The suspension system 24 includes a pair of laterally spaced apart lift arms 40, 41. The arms 40, 41 at their forward ends are pivotally connected to respective lower, laterally spaced portions of the header 14.

The suspension system 24 further includes a stabilizing bar 42 being centrally located, extending between and pivotally interconnecting the forward end of the main frame and an upper central portion of the header 14.

Figure 2:
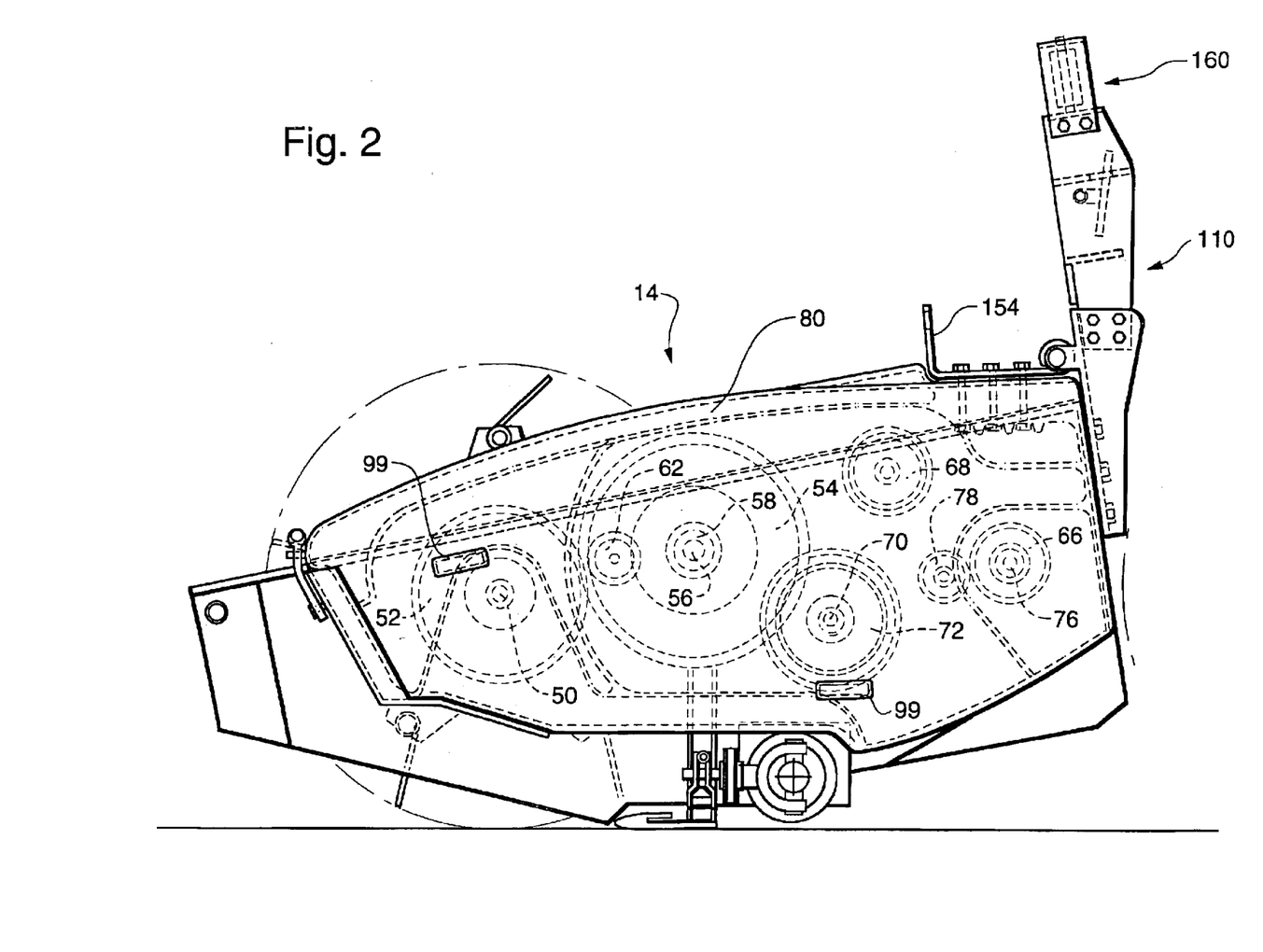
FIG. 2 is a side elevational view of the header of FIG. 1, taken along lines 2—2 showing the shield and latch mechanism of the instant invention and the drive subsystems of the header in phantom.
Figure 3:
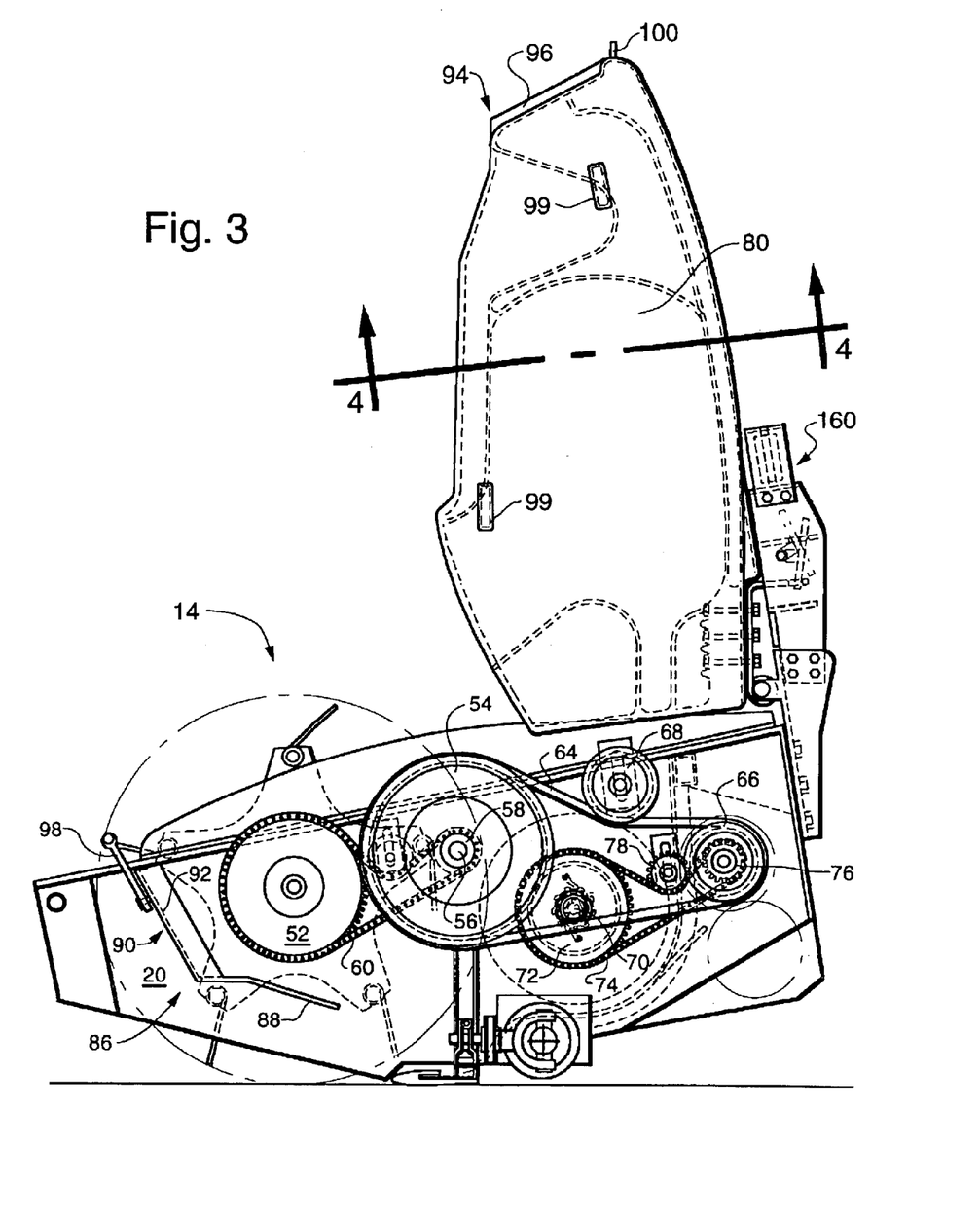
FIG. 3 is a side elevational view, similar to FIG. 2, showing the shield of the instant invention in the raised and locked position.

Referring now to FIGS. 1–3, it can be seen that the central shaft 50 of reel 30 is rotated from the left side of header 14 by reel drive sprocket 52, fixed to shaft 50. A reel sheave 54 is affixed to stub shaft 56 and to a smaller reel drive sprocket 58. A drive chain 60 engages the teeth on sprockets 52 and 58 such that rotation of sheave 54 results in rotation of reel 30. A tensioning sprocket 62 may be provided to maintain the appropriate chain tension. The relative operational diameters of the sprockets and sheaves are selected to provide the appropriate reel speed to ground speed ratios.

A v-belt 64 is fitted to the two sheaves 54 and 66 such that rotation of sheave 66 results in rotation of the reel 30. As discussed above, an adjustable tensioning pulley 68 may be advantageously added to extend the operational life of the v-belt 64 and improve the operation of the drive system.

Auger 36 is provided with an axial shaft 70 about which the auger rotates. On the left outward end of shaft 70 there is located a drive sprocket 72. Drive chain 74 engages the teeth on sprockets 72 and 76 such that rotation of sprocket 76 causes auger 30 to rotate in a relationship determined by the relative diameters of the two sprockets. A tensioning sprocket 78 can be added to take up unwanted slack in chain 74.

During field operation a large quantity of cut crop material flows through the header, generating considerable chaff and other debris that has a tendency to find its way to the various drive components and accumulate thereon. This build-up of materials causes extra wear on these components and may, in some instances result in a breakdown. In FIGS. 1 and 3 it can be seen clearly that the side sheet 18, on the left side of header 10, is an additional structural element of the header 10 that provides support for the various drive components thereof as well as a barrier to cut crop material, chaff and other debris from contact with the drive components on the exterior of the side sheet 18. The common well-known shielding for similar headers is made of sheet metal in the form of an open-sided box, hinged to the side sheet or other structural member by a generally vertical hinge along the rear of the header. The shield was non-conforming to the drive components and generally created a uniform enclosure for those components with the side sheet when in the operational position.

Figure 4:
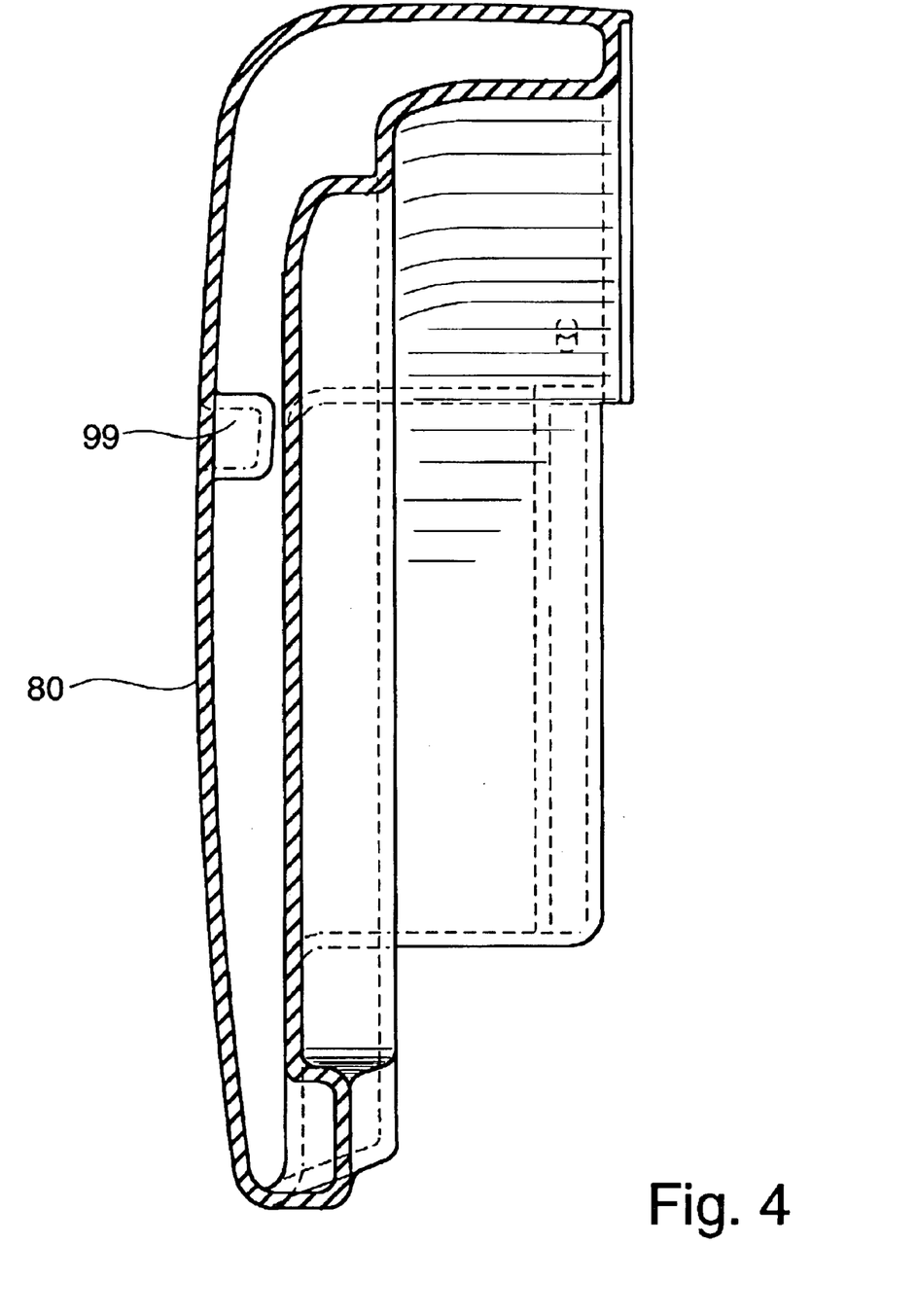
FIG. 4 is a cross-sectional view of the shield taken along lines 4—4 of FIG. 3.

As can be seen in the figures, particularly FIGS. 3 and 4, the improved side shield 80 of the present invention is comprised of a single molded double-walled component of a durable plastic resin, such as polyethylene. In sectional view, see FIG. 4, the shield is shown more or less molded to accommodate the drive components, i.e., to vary in depth to match the drive components and reduce the amount of open space between the shield 80 and the side sheet 20. This reduction in space reduces the build-up of cut crop material, chaff and debris, with the resultant improved performance and reduced maintenance. It should be noted from these figures also that the molding is not completely around the various operational components, but rather is such that there is adequate space provided to permit the shield to rotate upwardly into the open position without interference between the shield and these components.

To further inhibit the build-up of materials, shield 80 is, as seen in FIG. 4, open along the bottom thereof, i.e., the shield does not have a lip across the bottom portion thereof so that any materials that do enter the closed area of the shield may fall through the bottom onto the ground.

The double-walled configuration is made possible by rotational molding (also referred to as "rotomolding") techniques, and advantageously produces a shield that is of sufficient rigidity so as not to require a frame structure, is rust-free, is lighter in weight than its sheet metal predecessor, requires fewer parts, need not be painted, and can withstand considerable physical abuse without breaking or becoming misshapen. The design and construction of shield 80 is such that it additionally reduces rattles and may conveniently have a textured outer surface to minimize scratch mark visibility. The double-walled configuration is fully enclosed to prevent dirt and moisture from entering the shield cavity that would make it heavy to raise to the open position. Another advantage of the molding process is that integral handhold depressions can be easily formed in the outer side of the shield, such as at 99 in FIGS. 2–4. In the instant application, it has been determined that the walls of the shield should be approximately 3/16ths of an inch thick.

Affixed to side sheet 20, toward the front thereof is a shield support 86 (see FIG. 3). The shield support includes a lower angled portion 88 and an upper portion 90 formed with an angled outside lip 92 thereon. The forward portion 94 of shield 80 matches the shape of the support 86 and is additionally formed with a reduced thickness segment 96 that fits snugly in the upper portion 90 of support 86. When moved into the lowered operational position, the front portion 94 of shield 80 is guided into position relative to the support 86 by upper portion 90 of the support and also held in the appropriate lateral position thereby. Support 86 is dimensioned such that it will function properly even when shield 80 has expanded due to high ambient temperatures. An elastic rubber hold-down 98 is affixed to the front of support 86 to manually engage pin 100 on the upper front of shield 80 and further hold the shield in the operational position. This easy access front hold-down keeps the shield 80 in place particularly in rough terrain conditions and during shipping; however, if the hold-down is not affixed during normal operation, the shield will not be damaged because, contrary to the present sheet metal design that uses vertical hinges, shield 80 will not move toward, or swing outwardly, an open position—the majority of the weight biases the shield into the closed position. Additionally, support 86 may be flared slightly outwardly to promote the guidance characteristic when the shield is expanded due to high temperatures.

The figures further show a multi-purpose latch bracket 110 (only one of which will be described) on either side of the rear of header 14. The bracket 110 (FIGS. 5 and 6) is comprised of a u-shaped primary support member 112 affixed to a structural component at the rear of header 14, as by bolts 114, for example. Affixed to the legs of the u-shaped primary support member 112, by bolts 115, for example, is a pair of bracket arms 116, 118 that extend upwardly therefrom. Bracket arms 116, 118 are formed into a rigid latch structure by the addition of cross member 120 at the top and a leg 122 formed near the bottom in support member 112. The cross member 120 and leg 122 may be conveniently welded to the bracket arms 116, 118 for a rigid latch structure firmly affixed to header 14.

Figure 5:
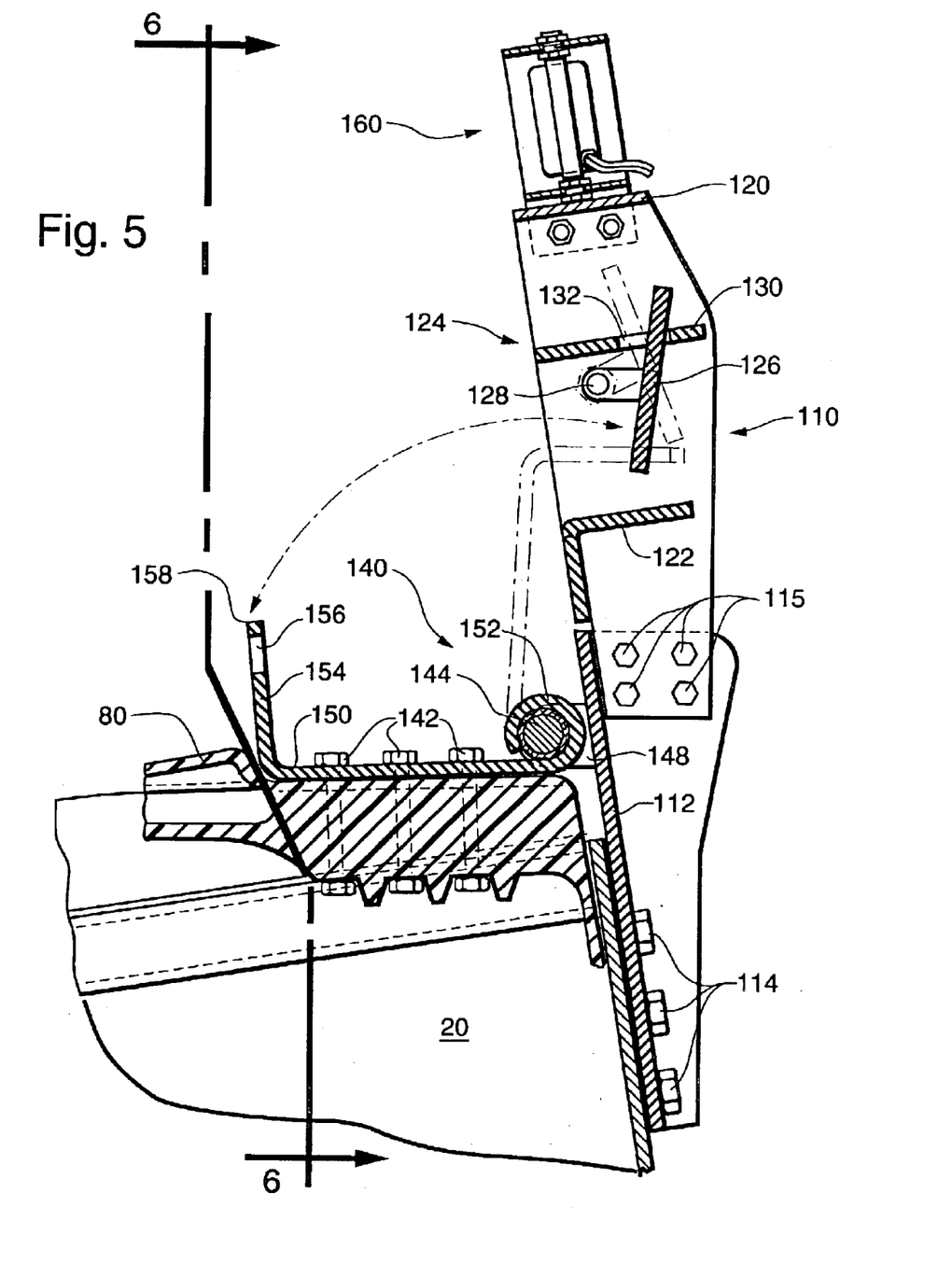
FIG. 5 is a partial side view of the latch mechanism of the instant invention.
Figure 6:
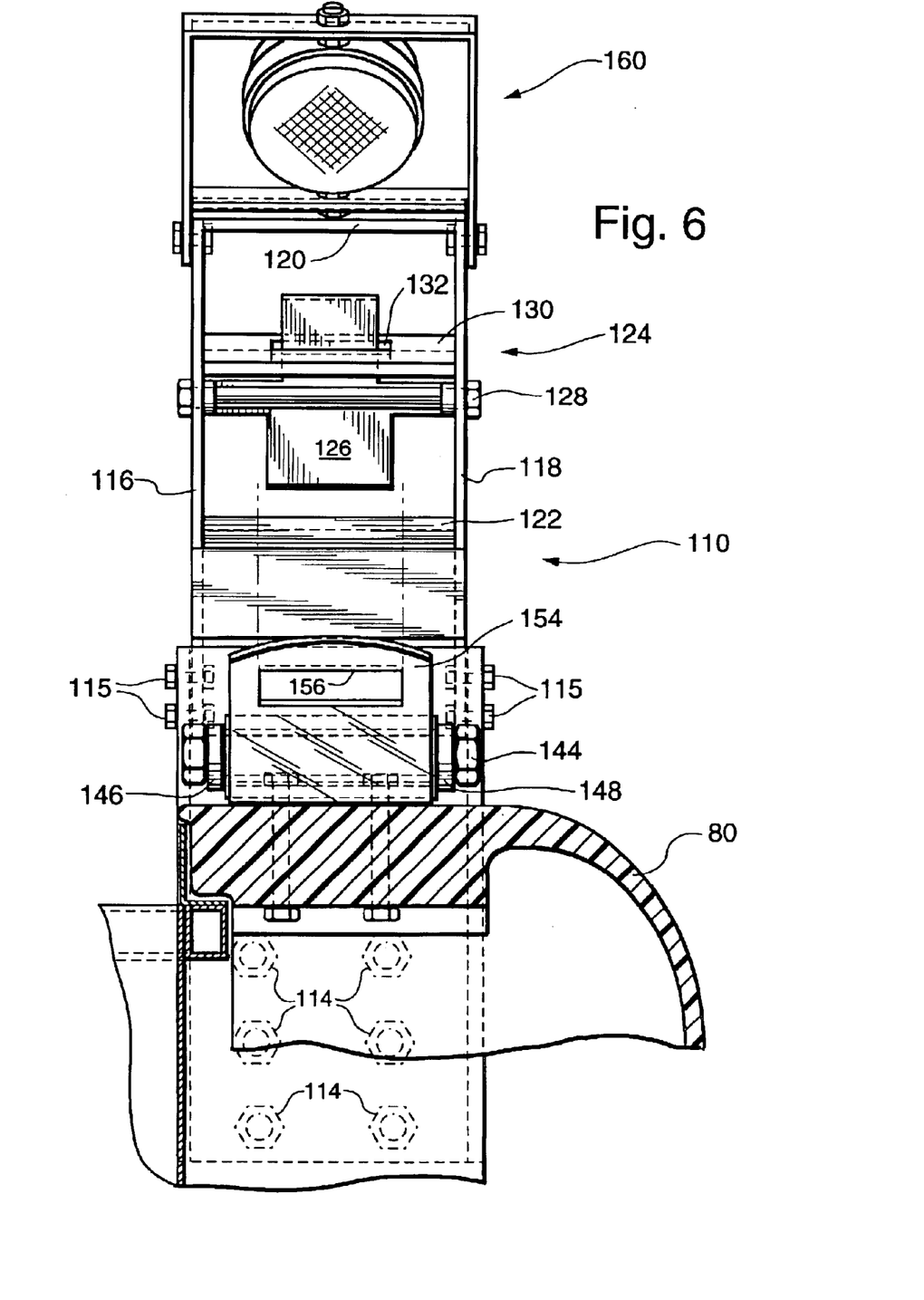
FIG. 6 is a partial cross-sectional view of the latch mechanism taken along lines 6—6 of FIG. 5.

The actual latching mechanism 124 is within the latch structure between cross member 120 and leg 122. The latching mechanism comprises a latch 126 in the form of a small plate freely pivotable about bolt 128 and a second cross member 130. Cross member 130 has a generally square opening therethrough 132 through which a portion of latch 126 extends such that latch 126 is limited by the sides of opening 132 in the amount of free rotation. The latch geometry somewhat utilizes the mechanics of a ratchet when allowing the latch hole 156 to pass the latch 126 when raising the shield, but entraps the latch within the latch hole 156 when trying to lower shield 80. Latch 126 is allowed to pivot away from the latch hole 156 when raising shield 80, but does not have a full range of pivot in the opposite direction when lowering, preventing the shield from dropping unless and until latch 126 is manually tripped.

A hinge 140 is affixed to the top rear portion of shield 80 by, for example, bolts 142. Hinge pin 144, in the form of a bolt, is fixed to the primary support member 112 by a pair of ears 146, 148. Hinge plate 150 includes, at one end, a barrel 152 that wraps around pin 144 for rotation, and a latch arm 154 at the other. Latch arm 154 has a latching hole therethrough 156 that is slightly larger than the width of latch 126. In operation, as can be seen in FIG. 5, by raising shield 80 it is pivoted about hinge 140, bringing the upper end 158 of latch arm 154 into contact with latch 126, causing it to pivot rearwardly. As the shield is raised further, latch 126 falls into latch hole 156. By releasing the shield at this point, it is locked into place by the interference created between latch 126 and the rear wall of opening 132. To release the shield 80, the shield must be raised a small distance so that the operator may manually push latch 126 into the dotted line position shown in FIG. 5, eliminating the interference and allowing the shield to be pivoted forwardly into the operational position. This arrangement provides for automatic latching in the raised position, requiring manual intervention to release and replace the shield into the operational position. Further, shield 80 is easily removed from the header by the removal of a single hinge bolt 144.

A important issue that is raised by an upwardly pivoting shield relates to winds moving across the field. In the raised position, the shield 80 provides a significant surface area that, when hit by a side-wind, would produce considerable bending forces on the hinge 140—forces that could break or damage the hinge or shield. Hinge 140 is intended to be quite strong; however, the design of the latching mechanism is such that it provides additional structural strength to maintain operational integrity even in relatively high side-wind conditions. Latch arm 154 fits, in the raised position, between bracket arms 116, 118 of bracket 110, generally adding the structural strength of bracket 110 to that of the hinge to counter the forces on the shield due to the sidewinds (see FIGS. 3 and 5).

Conveniently, a warning light 160 may be affixed to the latch structure to enhance the safe field and road operation of the equipment.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Accordingly, the following claims are intended to protect the invention broadly as well as in the specific form shown.

Having thus described the invention, what is claimed is:

1. A crop harvesting header and end shield comprising in combination:
   an elongate frame having a forward edge, an opposing rear end, and opposing first and second transverse end side sheets, said frame adapted to be attached to the forward end of a movable power source such as a tractor and adapted for forward travel over ground having standing crop thereon, said frame including a cutting assembly mounted along the lower forward edge of said frame and extending along the transverse length of said forward edge of said frame generally from said first end sheet to said second end sheet and in a plane generally transverse to the direction of forward travel; said header further including:
   an elongate reel mechanism having first and second ends mounted in said first and second end sheets transversely to the direction of travel generally above said cutting assembly;
   an elongate consolidation auger mechanism having first and second ends mounted in said first and second end sheets transversely to the direction of travel rearwardly of said reel mechanism; the first ends of said cutting assembly, said reel mechanism, and said auger mechanism each having a power input device thereon supported by said first end sheet;
   a drive mechanism on said frame drivingly connected to said power input devices for providing motive power to said cutting assembly, said reel mechanism and said auger mechanism, said drive mechanism at least partially supported by said first end side sheet; and
   at least said first side sheet having a shield therefore, said shield comprising:
   a one-piece double-walled molded plastic shield body having an upper edge, a generally opposing lower edge, a front end, a generally opposing rear end, inside and outside opposing surfaces; said inside surface molded to generally fit closely to said power input devices, creating an overall sealed moisture-resistant cavity;
   a horizontal hinge affixed to said frame and the upper rear edge of said shield such that said shield may be pivoted upwardly and rearwardly from a closed position covering said first end side sheet and said driven and drive mechanism supported thereon to an open position exposing same for ready access for service and other purposes.

2. The combination of claim 1, wherein:
   said shield is comprised of polyethylene.

3. The combination of claim 2, wherein:
   said shield is formed by a rotomolding process.

4. The combination of claim 3, wherein:
   the distance between said inside and outside opposing surfaces is minimized.

5. The combination of claim 4, wherein:
   in tie closed position, said lower edge of said shield is spaced from said first end sheet to allow cut crop material, chaff and debris to fall to the ground.

6. The combination of claim 5, wherein:
   said upper edge of said shield is substantially parallel to the top of said side sheet, providing a low-profile view over said header.

7. A crop harvesting header and end shield comprising in combination:
   an elongate frame having a forward edge, an opposing rear end, and opposing first and second transverse end side sheets, said frame adapted to be attached to the forward end of a movable power source such as a tractor and adapted for forward travel over ground having standing crop thereon, said frame including a cutting assembly mounted along the lower forward edge of said frame and extending along the transverse length of said forward edge of said frame generally from said first end sheet to said second end sheet and in a plane generally transverse to the direction of forward travel; said header further including:
   an elongate reel mechanism having first and second ends mounted in said first and second end sheets transversely to the direction of travel generally above said cutting assembly;
   an elongate consolidation auger mechanism having first and second ends mounted in said first and second end sheets transversely to the direction of travel rearwardly of said reel mechanism; the first ends of said cutting assembly, said reel mechanism, and said auger mechanism each having a power input device thereon supported by said first end sheet;
   a drive mechanism on said frame drivingly connected to said power input devices for providing motive power to said cutting assembly, said reel mechanism and said auger mechanism, said drive mechanism at least partially supported by said first end side sheet;

at least said first side sheet having a shield therefore, said shield comprising:

a one-piece double-walled molded plastic shield body having an upper edge, a generally opposing lower edge, a front end, a generally opposing rear end, inside and outside opposing surfaces; said inside surface molded to generally fit closely to said power input devices;

a horizontal hinge affixed to said frame and the upper rear edge of said shield such that said shield may be pivoted upwardly and rearwardly from a closed position covering said first end side sheet and said driven and drive mechanism supported thereon to an open position exposing same for ready access for service and other purposes; and said shield comprising a shield for each of said first and second side sheets, the shield for said second side sheet being generally the same as the shield described above, except that said inside surface is molded to generally fit closely to the second ends of said cutter assembly, said reel mechanism, said auger mechanism, and said drive mechanism.

8. In a crop harvesting header having an elongate frame having a forward edge, an opposing rear end, and opposing first and second transverse end side sheets, said frame adapted to be attached to the forward end of a movable power source such as a tractor and adapted for forward travel over ground having standing crop thereon, said frame including a cutting assembly mounted along the forward lower edge of said frame and extending along the transverse length of said forward edge of said frame generally from said first end sheet to said second end sheet and in a plane generally transverse to the direction of forward travel; said header further including:

an elongate reel mechanism having first and second ends mounted in said first and second end sheets transversely to the direction of travel generally above said cutting assembly;

an elongate consolidation auger mechanism having first and second ends mounted in said first and second end sheets transversely to the direction of travel rearwardly of said reel mechanism; the first ends of said cutting assembly, said reel mechanism, and said auger mechanism each having a power input device thereon supported by said first end sheet;

a drive mechanism on said frame drivingly connected to said power input devices for providing motive power to said cutting assembly, said reel mechanism and said auger mechanism, said drive mechanism at least partially supported by said first end side sheet; and at least said first side sheet having a shield therefore, the improvement comprising:

a one-piece double-walled molded plastic shield body having an upper edge, a generally opposing lower edge, a front end, a generally opposing rear end, inside and outside opposing surfaces; said inside surface molded to generally fit closely to said power input devices, creating an overall sealed moisture-resistant cavity;

a horizontal hinge affixed to said frame and the upper rear edge of said shield such that said shield may be pivoted upwardly and rearwardly from a closed position covering said first end side sheet and said driven and drive mechanism supported thereon to an open position exposing same for ready access for service and other purposes.

9. The combination of claim 8, wherein:

said shield is comprised of polyethylene.

10. The combination of claim 9, wherein:

said shield is formed by a rotomolding process.

11. The combination of claim 10, wherein:

the distance between said inside and outside opposing surfaces is minimized.

12. The combination of claim 11, wherein:

in the closed position, said lower edge of said shield is spaced from said first end sheet to allow cut crop material, chaff and debris to fall to the ground.

13. The combination of claim 12, wherein:

said upper edge of said shield is substantially parallel to the top of said side sheet, providing a low-profile view over said header.

14. The combination of claim 13, wherein:

said shield comprises a shield for each of said first and second side sheets, the shield for said second side sheet being generally the same as the shield described above, except that said inside surface is molded to generally fit closely to the second ends of said cutter assembly, said reel mechanism, said auger mechanism, and said drive mechanism.

* * * * *